United States Patent
Mori

(10) Patent No.: US 9,859,832 B2
(45) Date of Patent: Jan. 2, 2018

(54) MULTIPHASE ELECTRIC MOTOR CONTROL DEVICE

(71) Applicant: Yoji Mori, Aichi (JP)

(72) Inventor: Yoji Mori, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/352,828

(22) Filed: Nov. 16, 2016

(65) Prior Publication Data

US 2017/0141713 A1 May 18, 2017

(30) Foreign Application Priority Data

Nov. 16, 2015 (JP) ................ 2015-223801

(51) Int. Cl.
| | |
|---|---|
| H02P 1/00 | (2006.01) |
| H02P 27/00 | (2006.01) |
| H02P 23/14 | (2006.01) |
| H02P 6/14 | (2016.01) |
| H02P 27/08 | (2006.01) |
| H02M 7/5387 | (2007.01) |

(52) U.S. Cl.
CPC ........... H02P 23/14 (2013.01); H02P 6/14 (2013.01); H02P 27/08 (2013.01); H02M 7/53875 (2013.01)

(58) Field of Classification Search
None
See application file for complete search history.

(56) References Cited

U.S. PATENT DOCUMENTS

| | | | |
|---|---|---|---|
| 7,898,210 B2 * | 3/2011 | Hsieh ............. | H02M 7/53875 |
| | | | 318/400.3 |
| 8,816,612 B2 | 8/2014 | Suzuki | |
| 8,890,459 B2 | 11/2014 | Sakai et al. | |

FOREIGN PATENT DOCUMENTS

| | | |
|---|---|---|
| JP | 2010-220414 A | 9/2010 |
| JP | 2013-219905 A | 10/2013 |

* cited by examiner

*Primary Examiner* — Bentsu Ro
*Assistant Examiner* — Zemenay Truneh
(74) *Attorney, Agent, or Firm* — Osha Liang LLP

(57) ABSTRACT

A multiphase electric motor control device includes: a bridge circuit including phase circuits each including a high potential side switching element, a low potential side switching element, and a current detector, a PWM control unit that outputs PWM signals to the switching elements; a control unit that acquires phase current values at a timing synchronized with a triangle wave; and a current value estimation unit that estimates a phase current value of one phase based on phase current values of other phases. In a case where an ON time of the PWM signal output to the low potential side switching element of the one phase from the PWM control unit is shorter than a predetermined time, the control unit acquires the phase current values which are detected by shifting the timing by using the current detectors of at least the other phases.

3 Claims, 5 Drawing Sheets

MULTIPHASE ELECTRIC MOTOR CONTROL DEVICE

CROSS-REFERENCES TO RELATED APPLICATIONS

This application is based upon and claims the benefit of priority from Japanese Patent Application No. 2015-223801, filed on Nov. 16, 2015; the entire contents of which are incorporated herein by reference.

FIELD

One or more embodiments of the present invention relate to a multiphase electric motor control device.

BACKGROUND

In the related art, a technology is known which accurately detects phase current values of each phase so as to control switching elements of a bridge circuit which rotatably drives a multiphase electric motor, using PWM control.

For example, JP-A-2013-219905 discloses a control device of a multiphase rotary machine which appropriately secures a current detection time, while stabilizing control of a three-phase rotary machine. The control device includes a shunt resistor as current detection means between a lower MOS of an inverter unit and a negative electrode of a battery. While lower MOS's of two phases are turned on and a lower MOS in the other one phase is turned off, among three phases, the shunt resistor detects currents flowing through shunt resistors in the two phases in which the lower MOS's are turned on. The control device estimates a current in the one phase in which the lower MOS is turned off, using the Kirchhoff's law, and calculates a duty updating value during an updating period which is half a calculation period of a duty command value, by using linear interpolation based on the duty command value. In a case where the duty updating value of any one phase exceeds a maximum duty corresponding to a shortest detection time required for current detection which is performed by the shunt resistor, the duty updating value of each phase is increased. Thereby, while the lower MOS's in the two phases except for the phase are turned on, the current detection is performed, and thus, it is possible to appropriately secure time for the current detection which is performed by the shunt resistor.

In addition, JP-A-2010-220414 discloses a motor control device which ensures current detection with high accuracy and increases a voltage utilization ratio. In a case where an ON time of any one of respective switching elements on a low potential side corresponding to each phase is shorter than a detection time of a current value, in a drive circuit, the motor control device estimates a phase current value of an undetectable current phase, based on current values of two phases except for the undetectable current phase corresponding to the switching element. In addition, when the current detection is performed by using the estimation, the motor control device holds a switching state of a switching arm corresponding to the undetectable current phase, while the current detection of the two phases except for the undetectable current phase which is a basis of the estimation is performed. That is, since a high potential side switching element is maintained to be turned on and a low potential side switching element is maintained to be turned off, the motor control device outputs a motor control signal which prevents noise that is generated by the switching operation from being mixed thereinto. Thereby, although an output voltage limitation which is set to secure a detection time of phase current values of all phases is abolished, the motor control device can ensure current detection with high accuracy, and as a result, it is possible to increase the voltage utilization ratio.

SUMMARY

As described above, in a case where an ON time of any one of respective low potential side switching elements is shorter than a detection time of a phase current value, and thereby a phase whose stable phase current value is not capable of being detected is generated, although only phase current values of two phases except for the phase are detected, if a switching element in the phase is turned on or off during the time, noise which is generated according to the turning on or off of the switching element is mixed into the phase current values of the other two phases. In addition, in a case where the noise is mixed into the phase current value, it is assumed that effects of the noise will be able to be reduced by employing an integral value of the detected phase current value, but in principle, time is taken when employing the integral value before the phase current value is detected.

One or more embodiments of the invention provide a multiphase electric motor control device which detects a phase current value by reducing effects of noise without lengthening time that is taken until the phase current value is detected.

According to one or more embodiments of the invention, there is provided a multiphase electric motor control device which controls a multiphase electric motor, the multiphase electric motor control device including: a bridge circuit which is configured by connecting phase circuits in parallel with one another in correspondence with respective phases of the multiphase electric motor, each of the phase circuit including a high potential side switching element, a low potential side switching element, and a current detector which is provided on a closer side to a low potential than the low potential side switching element and which detects a phase current value, wherein the high potential side switching element, the low potential side switching element, and the current detector are connected in series to each other; a PWM control unit that outputs PWM signals to each of the switching elements of the bridge circuit such that the multiphase electric motor is rotatably driven based on a target value; a control unit that outputs a command voltage to the PWM control unit and acquires phase current values at a timing synchronized with a triangle wave; and a current value estimation unit that estimates a phase current value of one phase based on phase current values of other phases. In a case where an ON time of the PWM signal output to the low potential side switching element of the one phase from the PWM control unit is shorter than a predetermined time, the control unit acquires the phase current values detected by the current detectors of at least the other phases at another timing which is earlier than the timing and which is before the low potential side switching element in the one phase is turned on and after a predetermined time elapses from turning on of one of the low potential side switching elements in the other phases, where the one of the low potential side switching elements of the other phases is turned on at a latest time among the low potential side switching elements of the other phases which are being turned on.

With this configuration, the phase current values with an instantaneous value are acquired when the noise is reduced by detecting the phase current values at timing earlier than a normal timing, before a low potential side switching element in a phase in which the ON time of the PWM signal is shorter than a predetermined time is turned on, and after a predetermined time passes after the low potential side switching elements in other phases are turned on at the latest time. Accordingly, it is possible to provide the multiphase electric motor control device which detects the phase current value by reducing effects of noise without lengthening the time that is taken until the phase current values are detected.

According to one or more embodiments of the invention, there is provided a multiphase electric motor control device which controls a multiphase electric motor, the multiphase electric motor control device including: a bridge circuit which is configured by connecting phase circuits in parallel with one another in correspondence with respective phases of the multiphase electric motor, each of the phase circuits including a high potential side switching element, a low potential side switching element, and a current detector which is provided on a closer side to a low potential than the low potential side switching element and which detects a phase current value, wherein the high potential side switching element, the low potential side switching element, and the current detector are connected in series to each other; a PWM control unit that outputs PWM signals to each of the switching elements of the bridge circuit such that the multiphase electric motor is rotatably driven based on a target value; a control unit that outputs a command voltage to the PWM control unit and acquires phase current values at a timing synchronized with a triangle wave; and a current value estimation unit that estimates a phase current value of one phase based on phase current values of other phases. In a case where an ON time of the PWM signal output to the low potential side switching element of the one phase from the PWM control unit is shorter than a predetermined time, the control unit acquires the phase current values detected by the current detectors of at least the other phases at another timing which is later than the timing and which is after a predetermined time passes after the low potential side switching element in the one phase is turned off and before one of the low potential side switching elements in the other phases is turned off at an earliest time among the low potential side switching elements which are being turned on.

With this configuration, the phase current values with an instantaneous value are acquired when the noise is reduced by detecting the phase current values at timing later than normal timing, after a predetermined time passes after the low potential side switching element in the phase in which the ON time of the PWM signal is shorter than the predetermined time is turned off, and before the low potential side switching elements in other phases are turned off at an earliest time. Accordingly, it is possible to provide the multiphase electric motor that the time taken until the phase current values are detected is not lengthened, and the phase current values which are less affected by noise are detected.

According to one or more embodiments of the invention, there is provided a multiphase electric motor control device which controls a multiphase electric motor, the multiphase electric motor control device including: a bridge circuit which is configured by connecting phase circuits in parallel with one another in correspondence with respective phases of the multiphase electric motor, each of the phase circuit including a high potential side switching element, a low potential side switching element, and a current detector which is provided on a closer side to a low potential than the low potential side switching element and which detects a phase current value, wherein the high potential side switching element, the low potential side switching element, and the current detector are connected in series to each other; a PWM control unit that outputs PWM signals to each of the switching elements of the bridge circuit such that the multiphase electric motor is rotatably driven based on a target value; a control unit that outputs a command voltage to the PWM control unit and acquires phase current values at a timing synchronized with a triangle wave; and a current value estimation unit that estimates a phase current value of one phase based on phase current values of other phases, in a case where an ON time of the PWM signal output to the low potential side switching element of the one phase from the PWM control unit is shorter than a predetermined time, the control unit acquires the phase current values which are detected by shifting the timing by using the current detectors of at least the other phases.

With this configuration, the phase current values with an instantaneous value are acquired when the noise is reduced by detecting the phase current values at timing shifted from normal timing. Accordingly, it is possible to provide the multiphase electric motor that the time taken until the phase current values are detected is not lengthened, and the phase current values which are less affected by noise are detected.

As described above, according to one or more embodiments of the invention, it is possible to provide a multiphase electric motor control device which detects a phase current value by reducing effects of noise without lengthening time that is taken until the phase current value is detected, by employing an instantaneous value.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments according to the present invention will be described with reference to the drawings.

First Embodiment

Figure 1:
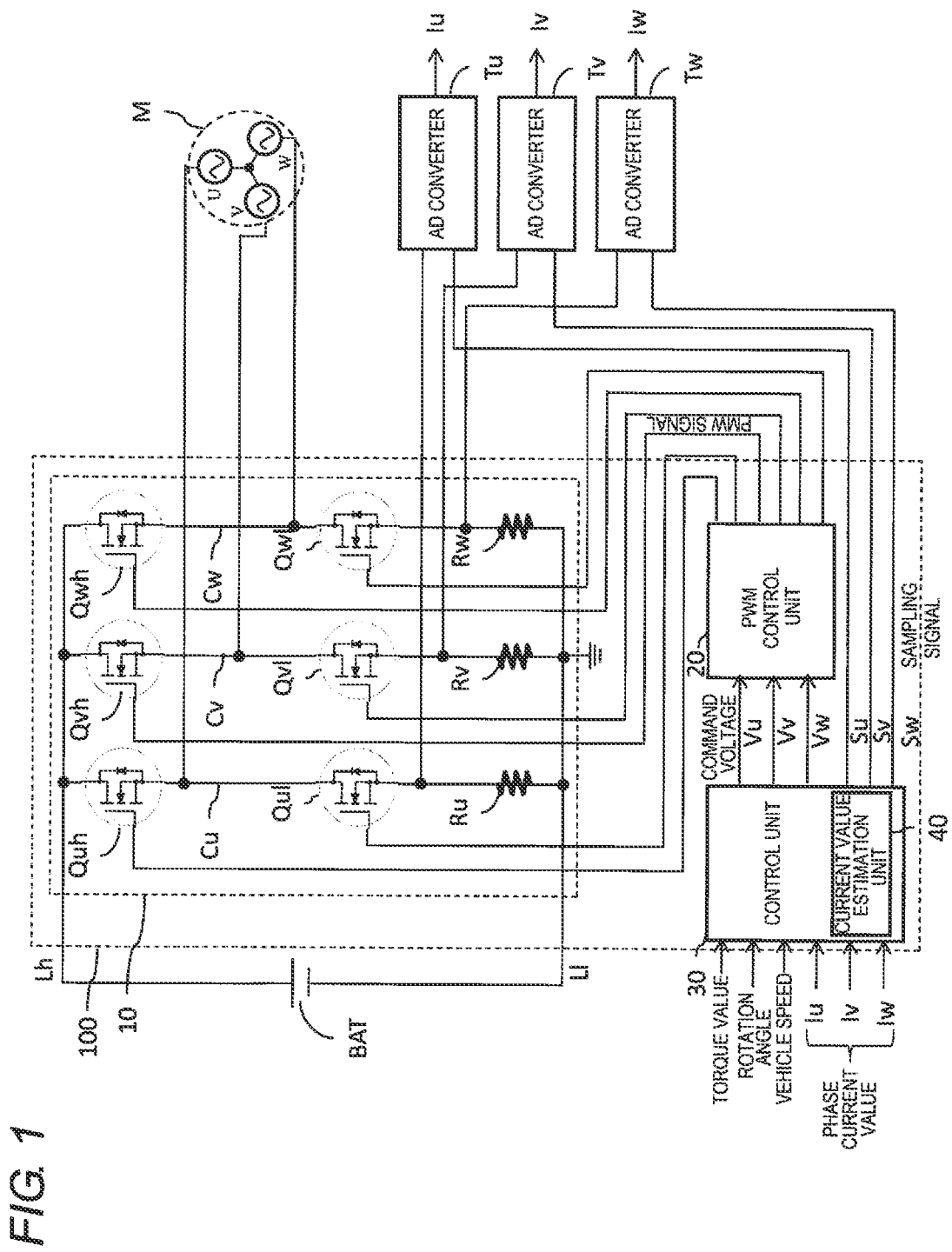
FIG. 1 is a block diagram illustrating a multiphase electric motor control device according to a first embodiment of the invention.

A multiphase electric motor control device 100 according to the present embodiment will be described with reference to FIG. 1. The multiphase electric motor control device 100 is a three-phase brushless motor which is used for an electric power steering device (not illustrated) of a vehicle or the like, and drives and controls a three-phase electric motor M which supplies auxiliary force for a steering operation. The multiphase electric motor control device 100 includes a bridge circuit 10 which is configured by connecting phase circuits Cu, Cv, and Cw in parallel with each other in correspondence with each phase of U, V, and W of the three-phase electric motor M, a PWM control unit 20 which outputs pulse width modulation (PWM) signals to each phase of the bridge circuit 10, and a control unit 30 which controls entirety of the present device.

The bridge circuit 10 is connected to a positive electrode side of a battery BAT through a power supply line Lh, and is connected (grounded) to a negative electrode side of the battery BAT through a ground line Ll. The phase circuits Cu, Cv, and Cw of the bridge circuit 10 include high potential side switching elements Quh, Qvh, and Qwh which are connected to the power supply line Lh, low potential side switching elements Qul, Qvl, and Qwl which are connected to the ground line Ll, and current detectors Ru, Rv, and Rw which are provided on a side closest to the ground line Ll. Each of the high potential side switching elements, each of the low potential side switching elements, and each of the current detectors are connected in series to each other. In the present embodiment, MOSFETs, that is, metal oxide semiconductor field effect transistors are used for the high potential side switching elements Quh, Qvh, and Qwh, and the low potential side switching elements Qul, Qvl, and Qwl.

Drains of the high potential side switching elements Quh, Qvh, and Qwh are connected to the power supply line Lh. In addition, sources of the high potential side switching elements Quh, Qvh, and Qwh are connected to drains of the low potential side switching elements Qul, Qvl, and Qwl. Sources of the low potential side switching elements Qul, Qvl, and Qwl are connected to the ground line Ll through the current detectors Ru, Rv, and Rw. The PWM signals which are generated by the PWM control unit 20 are input to gates of the high potential side switching elements Quh, Qvh, and Qwh and gates of the low potential side switching elements Qul, Qvl, and Qwl, and thereby sources thereof are connected or disconnected to drains thereof.

The current detectors Ru, Rv, and Rw are resistors (shunt resistors) for current detection, are provided on a lower potential side (ground side) than the low potential side switching elements Qul, Qvl, and Qwl, and detect currents which are supplied to each of the phases U, V, and W of the three-phase electric motor M from the bridge circuit 10, using a method which will be described below. In general, the three-phase electric motor M of an electric power steering device supplies drive power by energizing a sinusoidal wave. At this time, current values of each phase U, V, and W need to be fed back, and thus, the current detectors Ru, Rv, and Rw are provided in the respective phase circuits Cu, Cv, and Cw so as to perform current detection of each phase.

Connection points between the high potential side switching elements Quh, Qvh, and Qwh and the low potential side switching elements Qul, Qvl, and Qwl are respectively connected to the phases U, V, and W of the three-phase electric motor M. In addition, connection points between the low potential side switching elements Qul, Qvl, and Qwl and the current detectors Ru, Rv, and Rw are respectively connected to AD converters Tu, Tv, and Tw which output phase current values Iu, Iv, and Iw that are obtained by converting phase current values of analog values of the respective phase circuits Cu, Cv, and Cw into digital values.

The control unit 30 receives the phase current values Iu, Iv, and Iw which are output from the AD converters Tu, Tv, and Tw, a steering torque value which is obtained from another sensor or an electric control unit (ECU, not illustrated), a rotation angle (electrical angle) of the three-phase electric motor M, and vehicle speed as input. The control unit 30 calculates command voltages Vu, Vv, and Vw for each phase corresponding to auxiliary force which is a target value that the three-phase electric motor M provides for steering, based on a steering torque value or a rotation angle that a driver provides for steering at the time of vehicle speed, and the phase current values Iu, Iv, and Iw that the AD converters Tu, Tv, and Tw detect. The control unit outputs the calculated command values to the PWM control unit 20. The control unit 30 is configured with a microcomputer which includes a CPU, a memory, and the like.

The PWM control unit 20 generates duty instruction values Du, Dv, and Dw, based on the command voltages Vu, Vv, and Vw of each phase that the control unit 30 outputs. In addition, the PWM control unit 20 generates the PWM signals which rotatably drive the three-phase electric motor M, and outputs the PWM signals to the high potential side switching elements Quh, Qvh, and Qwh and the low potential side switching elements Qul, Qvl, and Qwl, based on the duty instruction values Du, Dv, and Dw. The PWM signals are respectively input to the gates of the high potential side switching elements Quh, Qvh, and Qwh and the gates of the low potential side switching elements Qul, Qvl, and Qwl. The bridge circuit 10 converts power of the battery BAT which is a DC power supply using PWM control, and supplies the converted power to the three-phase electric motor M.

In addition, the control unit 30 outputs sampling signals Su, Sv, and Sw indicating timing at which the AD converters Tu, Tv, and Iw detect currents, to the AD converters Tu, Tv, and Tw. The timing to detect the current will be described below. The AD converters Tu, Tv, and Tw detect currents, based on the sampling signals Su, Sv, and Sw, and feed back phase current values Iu, Iv, and Iw to the control unit 30.

In addition, the multiphase electric motor control device 100 further includes a current value estimation unit 40 which estimates phase current values of phases, based on phase current values of the other two phases other than one phase, in a case where the one phase in which an ON times of the PWM signals that are output to the low potential side switching elements Qul, Qvl, and Qwl are shorter than a predetermined time is generated. A method of estimating the phase current values is a known method, and performs estimation, based on, for example, the Kirchhoff's law. In the present embodiment, the current value estimation unit 40 is described as a part of the control unit 30 in a microcomputer, but is not limited to this, and may be provided in another microcomputer.

First, timing when a general multiphase electric motor control device detects a current will be described with reference to FIGS. 5A and 5B.

The sinusoidal waves energizing each phase U, V, and W of the three-phase electric motor M are configured by three sinusoidal wave signals which having the same amplitude as each other, each being shifted by 120°. In order to generate the sinusoidal wave signals, the PWM control unit 20 generates the PWM signals which turn on or off the high potential side switching elements Quh, Qvh, and Qwh and the low potential side switching elements Qul, Qvl, and Qwl, by comparing a PWM reference signal P of a triangle signal with a cycle much shorter than a cycle of the sinusoidal signal, with the duty instruction values Du, Dv, and Dw corresponding to the command voltages Vu, Vv, and Vw which are a target.

Specifically, the PWM control unit 20 compares the two signals with each other, and turns off the high potential side switching elements Quh, Qvh, and Qwh and turns on the low potential side switching elements Qul, Qvl, and Qwl corresponding thereto, at a section in which the PWM reference signal P has a larger value than the duty instruction values Du, Dv, and Dw. In contrast to this, the PWM control unit 20 turns on the high potential side switching elements Quh, Qvh, and Qwh and turns off the low potential side switching elements Qul, Qvl, and Qwl corresponding thereto, at a section in which the PWM reference signal P has a smaller value than the duty instruction values Du, Dv, and Dw. That is, when the high potential side switching elements Quh, Qvh, and Qwh of the respective phase circuits Cu, Cv, and Cw are turned on, the low potential side switching elements Qul, Qvl, and Qwl of the respective phase circuits Cu, Cv, and Cw are turned off, and vise versa.

The current detectors Ru, Rv, and Rw are provided at a side closer to the low potential than the low potential side switching elements Qul, Qvl, and Qwl, and thus, detection of the phase current values of the respective phase circuits Cu, Cv, and Cw is performed at timing when the low potential side switching elements Qul, Qvl, and Qwl are all turned on. That is, as illustrated in FIGS. 5A and 5B or the like, the current detectors Ru, Rv, and Rw normally perform the detection at timing when being synchronized to the periphery of the top of the triangle wave signal of the PWM reference signal P.

Figure 5A:
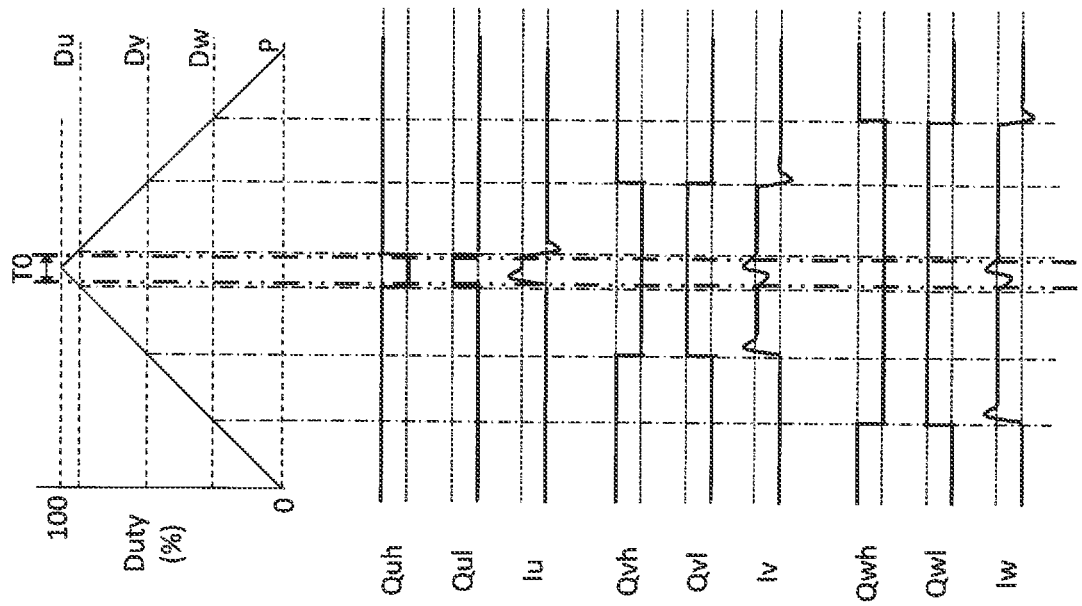
FIG. 5A is an explanatory diagram illustrating a current detecting method in a multiphase electric motor control device in a case where the time when the low potential side switching elements are maintained to be all turned on is sufficiently longer than a current detection time.

Strictly speaking, the detected phase current values Iu, Iv, and Iw do not have a square wave, as illustrated in FIG. 5A. That is, when the low potential side switching elements Qul, Qvl, and Qwl are turned on, the phase current values Iu, Iv, and Iw require rising time of a waveform and require convergence time until overshoot occurs, ringing according to rising of the waveform is generated, and converged. In addition, when the low potential side switching elements Qul, Qvl, and Qwl are turned off, the phase current values Iu, Iv, and Iw require falling time of the waveform and require convergence time until undershoot occurs, ringing according to falling of the waveform is generated, and converged.

Time which is obtained by adding the time required for rising when the waveform rises to the convergence time until the ringing is generated and converged is referred to as T1. In addition, time which is obtained by adding the time required for falling when the waveform falls to the time in which the ringing is generated and converged is referred to as T2. It is assumed that the embodiments in the present specification describes a case where time when the low potential side switching element Qul of the phase circuit Cu is maintained to be turned on is the shortest, compared to the low potential side switching elements Qvl and Qwl of the other phase circuits Cv and Cw, Hence, the time when the low potential side switching element Qul is maintained to be turned on is the time when the other low potential side switching elements Qvl and Qwl are maintained to be all turned on. Of course, it is needless to say that the time when the low potential side switching element Qul is maintained to be turned on is not limited to the shortest time, compared to the time when the other low potential side switching elements Qvl and Qwl are maintained to be all turned on.

As illustrated in FIG. 5A, in order to detect the current, a certain time is actually required. In the present specification, time required for detecting the current is referred to as T0. In a case where the time when the low potential side switching element Qul of the phase circuit Cu is maintained to be turned on is sufficiently longer than the time T0 required for detecting the current, the current is not detected at the time T1 when the current is not stable, and thus, the phase current value which is stable and has less noise can be detected. As a result, it is possible to reduce effect of the noise on the phase current values of the other phase circuits Cv and Cw.

Figure 5B:
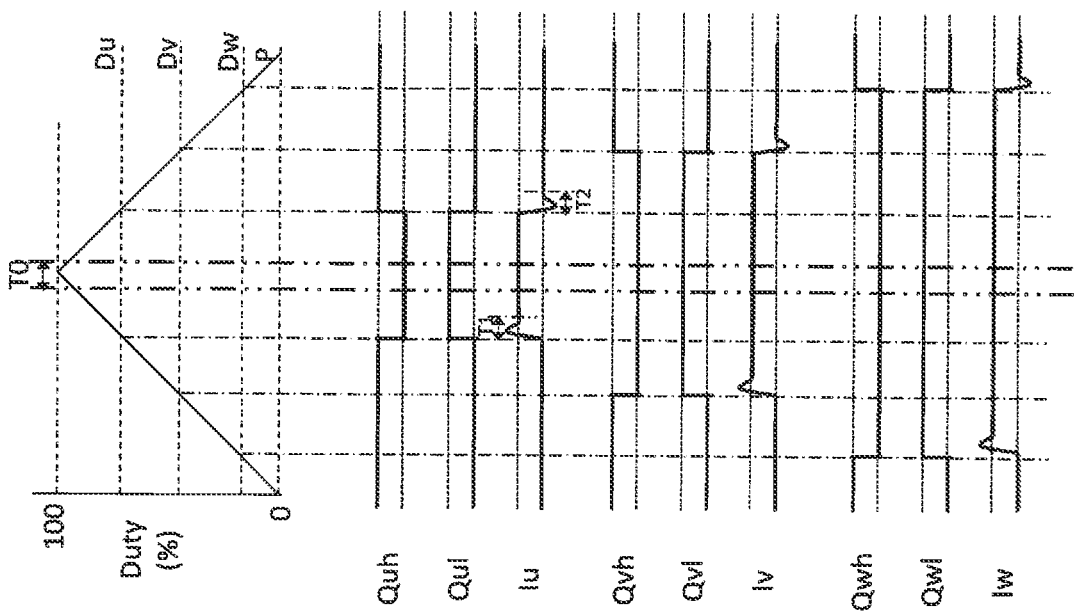
FIG. 5B is an explanatory diagram illustrating a current detecting method in a multiphase electric motor control device in a case where the time when the low potential side switching elements are maintained to be all turned on is substantially the same as the current detection time.

Meanwhile, as illustrated in FIG. 5B, a length of the time when the low potential side switching element Qul of the phase circuit Cu is maintained to be turned on is substantially the same as the time T0 required for detecting the time, and thus, the time when the phase current value rises and the time when the ringing is generated are contained in the time T0 required for detecting the time. If doing so, the phase current value which contains the noise is detected. As a result, the other phase circuits Cv and Cw are also affected by the noise, and thereby the noise which is generated when the low potential side switching element Qul is turned on during the time T0 required for detecting the time is mixed into the other phase circuits. Hence, if the phase current values into which the noise is mixed are detected, the phase current values containing the noise are fed back to the control unit, although only the phase current values of the phase circuits Cv and Cw are detected and fed back. Accordingly, appropriate command voltages are not generated, the three-phase electric motor is not capable of being driven, and auxiliary force with high accuracy is not capable of being provided.

Figure 2A:
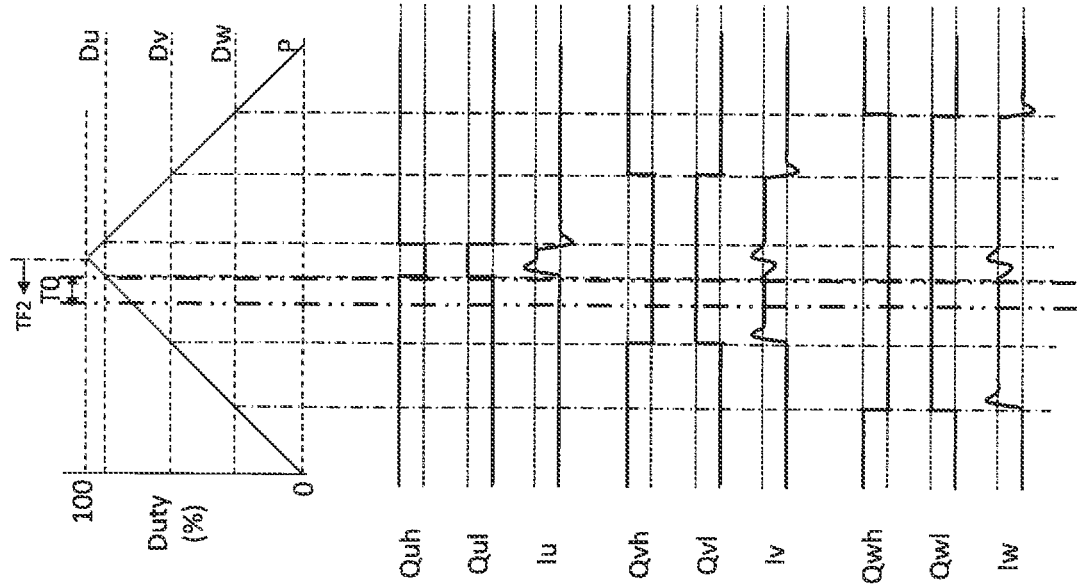
FIG. 2A is an explanatory diagram illustrating a case where a phase current value is detected at a timing which is earlier than a normal timing by a maximum possible time sift amount, and which is before a low potential side switching element in a phase in which an ON time of a PWM signal is shorter than a predetermined time is turned on and after the predetermined time elapses from turning on of one of the low potential side switching elements in other phases, where the one of the low potential side switching elements of the other phases is turned on at a latest time among the low potential side switching elements of the other phases which are being turned on, in the multiphase electric motor control device according to the first embodiment of the invention.

Timing when the multiphase electric motor control device 100 according to one or more embodiments of the invention detect the current will be described with reference to FIGS. 2A and 2B. In FIG. 2A, the control unit 30 of the multiphase electric motor control device 100 performs control such that the phase current values are detected at timing which is shifted forward by TF1 from timing when being synchronized to the periphery of the top of the triangle wave signal of the normal PWM reference signal P which is described in FIGS. 5A and 5B. Specifically, the control unit 30 outputs the sampling signals Sv and Sw to the AD converters Tv and Tw at timing earlier than before by TF1, and thereby the current detectors Rv and Rw detect currents at timing earlier than before by TF1, and the control unit 30 can acquire the phase current values Iv and Iw which are obtained by the AD converters Tv and Tw. Of course, the control unit 30 outputs the sampling signal Su to the AD converter Tu at timing earlier than before by TF1, and thereby the current detector Ru may detect currents at timing earlier than before by TF1. However, in a case where the low potential side switching element Qul is turned off, the current detector Ru is not actually capable of detecting the current, and although detecting the current, the current detector may not employ the corresponding phase current value.

In a case where the current detection is performed earlier than before by TF1, the earliest point of time to start the current detection is a point of time when a predetermined time passes after the phase circuit Cv is activated, because the phase circuit Cv is activated later among the phase circuit Cv and the phase circuit Cw. Here, the predetermined time is the time T1 that is obtained by adding the time required for rising when the waveform rises and the convergence time until the ringing is generated and converged, which are described above. If the current detection is started at this time, it is possible to detect the stable phase current values in which the noise that is generated according to the low potential side switching element Qvl which is turned on is reduced. In a case where the current detection is performed earlier than before by TF1, a point of time when the current detection is ended is a point of time when the time T0 required for detecting the current passes from the earliest point of time. In a case where the current detection is performed earlier than before by TF1, the point of time when the current detection is ended needs to be a point of time before the low potential side switching element Qul is turned on, such that the phase current value into which noise is mixed due to the low potential side switching element Qul that are turned on is not detected.

Figure 2B:
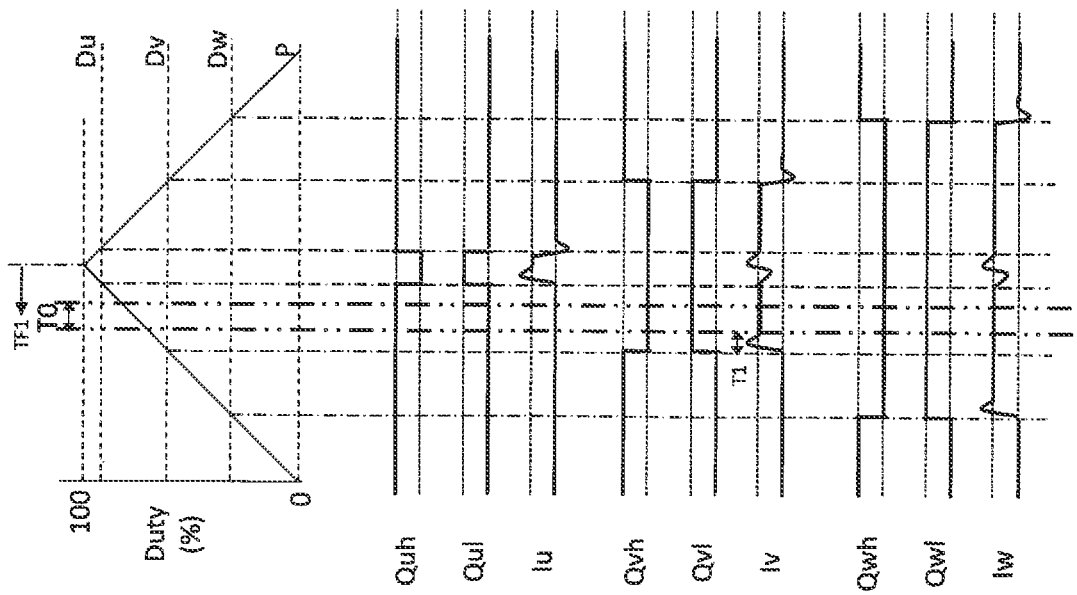
FIG. 2B is an explanatory diagram illustrating a case where the phase current value is detected at a timing which is earlier than the normal timing by a minimum possible time sift amount, and which is before the low potential side switching element in the phase in which the ON time of the PWM signal is shorter than the predetermined time is turned on, and after the predetermined time elapses from turning on of one of the low potential side switching elements in other phases, where the one of the low potential side switching elements of the other phases is turned on at the latest time among the low potential side switching elements of the other phases which are being turned on, in the multiphase electric motor control device according to the first embodiment of the invention.

In FIG. 2B, the control unit 30 performs control such that the phase current values are detected at timing which is shifted forward by TF2 from timing when being synchronized to the periphery of the top of the triangle wave signal of the PWM reference signal P. That is, the control unit 30 outputs the sampling signals Sv and Sw to the AD converters Tv and Tw at timing earlier than before by TF2, and thereby the current detectors Rv and Rw detect currents at timing earlier than before by TF2, and the control unit 30 can acquire the phase current values Iv and Iw which are obtained by the AD converters Tv and Tw. In a case where the current detection is performed earlier than before by TF2, a last point of time when the current detection is ended is a point of time (immediately before) before the low potential side switching element Qul of the phase circuit Cu is turned on. If the current detection is ended at this time, it is possible to detect the stable phase current values in which the noise that is generated according to the low potential side switching element Qul which is turned on is reduced. Hence, in a case where the current detection is performed earlier than before by the time between TF1 and TF2 (in other words, time which is equal to or earlier than TF1 and is equal to or later than TF2), it is possible to detect the phase current value which have less noise and is stable, as an instantaneous value.

In a case where an ON time of the PWM signal which is output to the low potential side switching element Qul of the phase circuit Cu is shorter than a predetermined time, the control unit 30 acquires the phase current values which are detected by the current detectors Rv and Rw of at least the other phase circuits Cv and Cw at timing earlier than a normal time after a predetermined time passes after the low potential side switching elements of the other phase circuits Cv and Cw are turned on at the latest time, before the low potential side switching element Qul of the phase circuit Cu is turned on. According to this, the phase current values with an instantaneous value are acquired when the noise is reduced by detecting the phase current values at timing earlier than the normal time after a predetermined time passes, before a low potential side switching element of a phase in which the ON time of the PWM signal is shorter than the predetermined time is turned on, and after the low potential side switching elements in other phases are turned on at the latest time. Accordingly, the time taken until the phase current values are detected is not lengthened, and the phase current values which are less affected by noise are detected.

"In a case where the ON time of the PWM signal which is output to the low potential side switching element Qul is shorter than a predetermined time", the "predetermined time" is obtained by adding the time T0 required for detecting the current, and the time T1 which is obtained by adding the time required for rising when the waveform rises and the convergence time until the ringing is generated and converged. In a case where the ON time of the PWM signal is shorter than the "predetermined time", the noise which is generated according to turning on and off of the low potential side switching element Qul is necessarily mixed. Actually, the "predetermined time" which is described in the present specification is appropriately determined by electrical characteristics of configuration elements, which are used, of a circuit.

Figure 3:
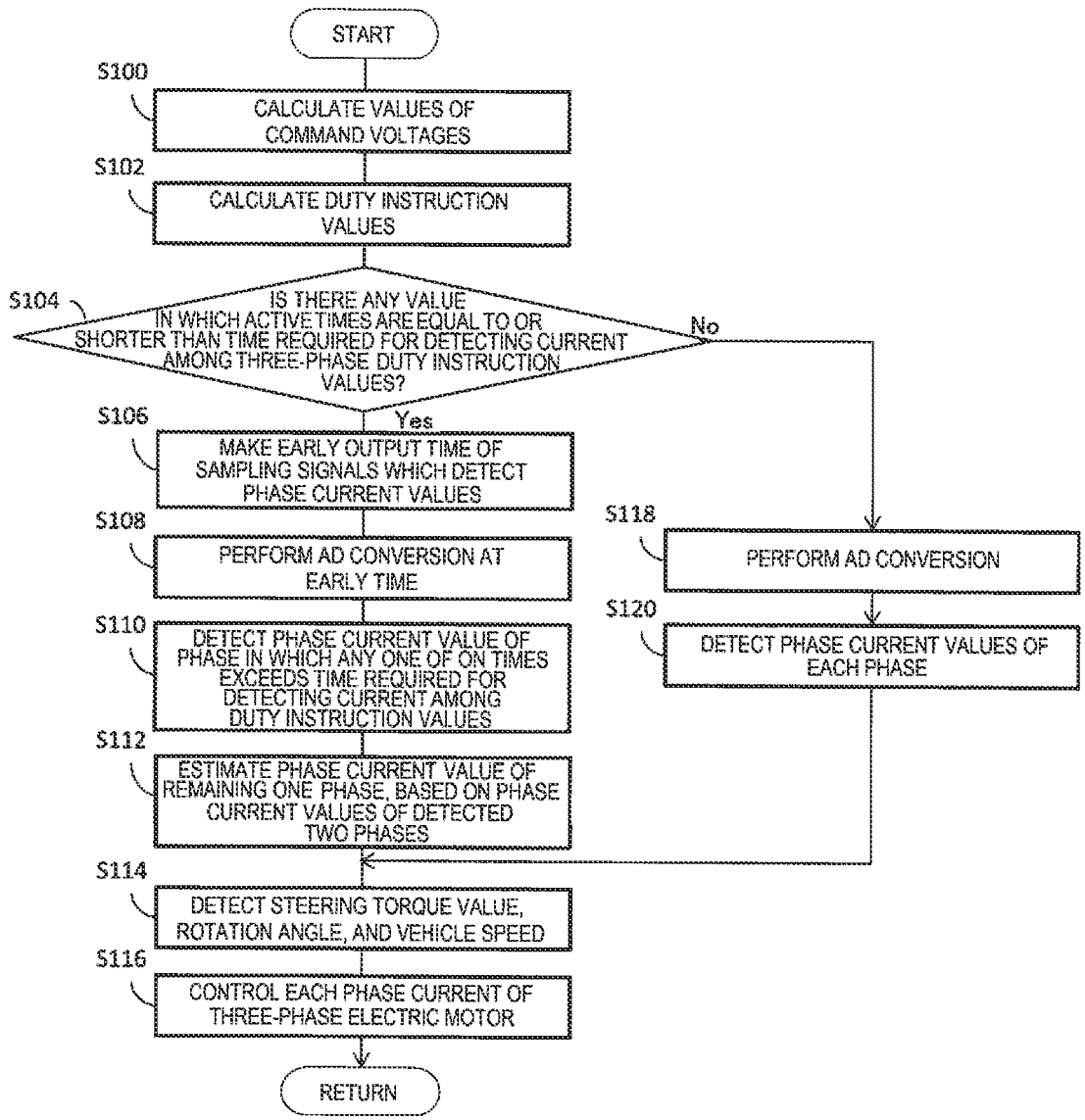
FIG. 3 is a flowchart illustrating a control method of the multiphase electric motor control device according to the first embodiment of the invention.

A control method of the multiphase electric motor control device 100 will be described with reference to FIG. 3. S in a flowchart means a step. In S100, the multiphase electric motor control device 100 calculates the command voltages Vu, Vv, and Vw which are a target during the cycle, based on the phase current values Iu, Iv, and Iw or the like which are fed back during a previous cycle. In S102, the multiphase electric motor control device 100 calculates the duty instruction values Du, Dv, and Dw with respect to the phase circuits Cu, Cv, and Cw, based on the calculated command voltages Vu, Vv, and Vw. In addition, in S104, the multiphase electric motor control device 100 tests whether or not there is any value in which the ON times of the low potential side switching elements Qul, Qvl, and Qwl are equal to or shorter than the time T0 required for detecting the current, among the calculated duty instruction values Du, Dv, and Dw.

In a case where there is no ON time which is equal to or shorter than the time T0 required for detecting the current, among the ON times of the low potential side switching elements Qul, Qvl, and Qwl, the multiphase electric motor control device 100 outputs signals which are converted from analog signals to digital signals by outputting the sampling signals Su, Sv, and Sw in S118, and detects the respective phase current values Iu, Iv, and Iw of the respective phases Cu, Cv, and Cw in S120, during the normal time. Thereafter, S114 which will be described below are continuously performed. In a case where one of the ON times of the low potential side switching elements Qul, Qvl, and Qwl is equal to or shorter than the time T0 required for detecting the current, the following processing is performed.

In S106, the multiphase electric motor control device 100 sets the timing when the sampling signals are output to the AD converter so as to be earlier than before by the time which is equal to or later than TF2 and is equal to or earlier than TF1. If doing so, the AD converts perform AD conversions at the earlier time, in S108. In S110, the multiphase electric motor control device 100 detects the phase current value, which is converted from analog value to digital value, of the phase circuit in which any one of the ON times of the low potential side switching elements Qul, Qvl, and Qwl is not equal to or shorter than the time T0 required for detecting the current, that is, the phase circuit in which the ON time exceeds the time T0 required for detecting the current.

In S112, the current value estimation unit 40 in the multiphase electric motor control device 100 estimates the phase current value of the phase circuit in which the ON time is equal to or shorter than the time T0 required for detecting the current, based on the phase current values of the phase circuits of two phases in which the ON times exceed the time T0 required for detecting the current. In S114, the multiphase electric motor control device 100 detects a steering torque value of steering, a rotation angle of the three-phase electric motor M, and vehicle speed from the ECU or the sensor. In S116, the multiphase electric motor control device 100 controls phase currents of the respective phases U, V, and W of the three-phase electric motor M, based on the phase current values of the phase circuits in the two phases in which the ON times exceed the time T0 required for detecting the current, and the phase current values which are estimated from the phase current values.

Second Embodiment

A multiphase electric motor control device 100 according to the present embodiment will be described with reference to FIGS. 4A and 4B. A configuration of the multiphase electric motor control device 100 is the same as that of the multiphase electric motor control device 100 according to the first embodiment, and thus, hereinafter, timing when the multiphase electric motor control device 100 detects a current, which is different from the timing of the first embodiment, will be described.

Figure 4B:
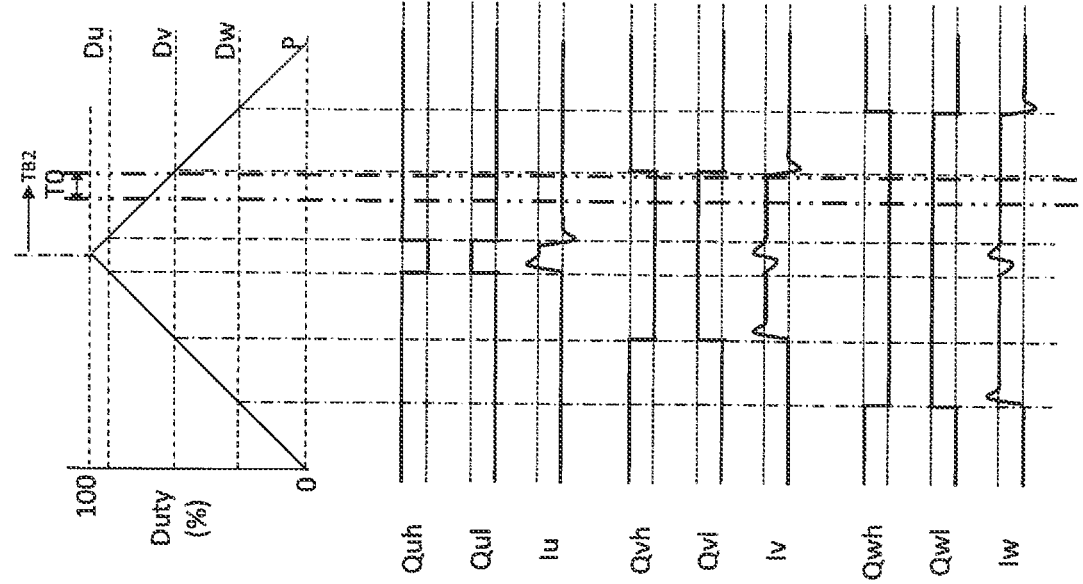
FIG. 4B is an explanatory diagram illustrating a case where the phase current value is detected at a timing which is later than the normal timing by a maximum possible time sift amount, and which is after the predetermined time passes after the low potential side switching element in the phase in which the ON time of the PWM signal is shorter than the predetermined time is turned off, and before one of the low potential side switching elements in other phases is turned off at the earliest time among the low potential side switching elements which are being turned on, in a multiphase electric motor control device according to the second embodiment of the invention.
Figure 4A:
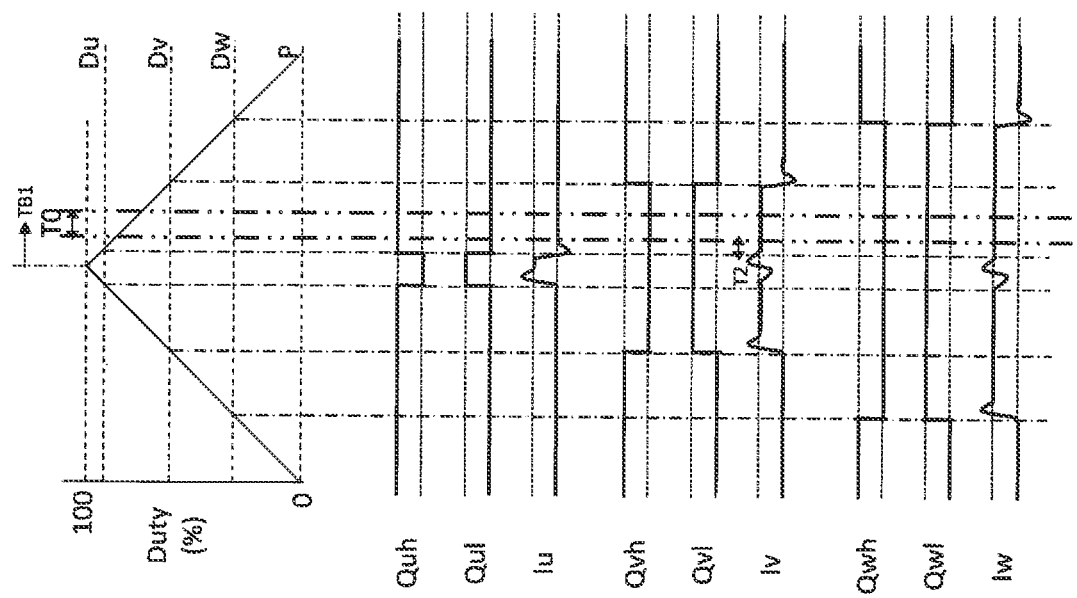
FIG. 4A is an explanatory diagram illustrating a case where a phase current value is detected at a timing which is later than a normal timing by a minimum possible time sift amount, and which is after a predetermined time passes after a low potential side switching element in a phase in which an ON time of a PWM signal is shorter than a predetermined time is turned off, and before one of low potential side switching elements in other phases is turned off at an earliest time among the low potential side switching elements which are being turned on, in a multiphase electric motor control device according to a second embodiment of the invention.

In FIG. 4A, the control unit 30 performs control such that the phase current values are detected at timing which is shifted backward by TB1 from timing when being synchronized to the periphery of the top of the triangle wave signal of the normal PWM reference signal P which is described in FIGS. 5A and 5B. Specifically, the control unit 30 outputs the sampling signals Sv and Sw to the AD converters Tv and Tw at timing later than before by TB1, and thereby the current detectors Rv and Rw detect currents at timing later than before by TB1, and the control unit 30 can acquire the phase current values Iv and Iw which are obtained by the AD converters Tv and Tw.

In a case where the current detection is performed later than before by TB1, the earliest point of time to start the current detection is a point of time (immediately after) when a predetermined time passes after the low potential side switching element Qul of the phase circuit Cu is turned off. Here, the predetermined time is the time T2 that is obtained by adding the time required for falling when the waveform falls and the convergence time in which the ringing is generated and converged, which are described above. If the current detection is started at this time, it is possible to detect the stable phase current values in which the noise that is generated according to the low potential side switching element Qul which is turned off is reduced. In a case where the current detection is performed later than before by TB1, a point of time when the current detection is ended is a point of time when the time T0 required for detecting the current passes from the earliest point of time. In a case where the current detection is performed later than before by TB1, the point of time when the current detection is ended needs to be a point of time before the low potential side switching element Qvl is turned off, such that the phase current value into which noise is mixed due to the low potential side switching element Qvl that are turned off is not detected, because the phase circuit Cv is deactivated at early time, among the phase circuit Cv and the phase circuit Cw.

In FIG. 4B, the control unit 30 performs control such that the phase current values are detected at timing which is shifted backward by TB2 from timing when being synchronized to the periphery of the top of the triangle wave signal of the normal PWM reference signal P. That is, the control unit 30 outputs the sampling signals Sv and Sw to the AD converters Tv and Tw at timing later than before by TB2, and thereby the current detectors Rv and Rw detect currents at timing later than before by TB2, and the control unit 30 can acquire the phase current values Iv and Iw which are obtained by the AD converters Tv and Tw.

In a case where the current detection is performed later than before by TB2, a last point of time when the current detection is ended is a point of time (immediately before) before the low potential side switching element Qvl of the phase circuit Cv is turned off. If the current detection is ended at this time, it is possible to detect the stable phase current values in which the noise that is generated according to the low potential side switching element Qvl which is turned off is reduced. Hence, in a case where the current detection is performed later by the time between TB1 and TB2 (in other words, time which is equal to or earlier than TB1 and is equal to or later than TB2), it is possible for the control unit 30 to detect the phase current value which have less noise and is stable, as an instantaneous value.

In a case where the ON time of the PWM signal which is output to the low potential side switching element Qul of the phase circuit Cu is shorter than a predetermined time, the control unit 30 acquires the phase current values which are detected by the current detectors Rv and Rw of at least the other phase circuits Cv and Cw at timing later than normal timing after a predetermined time passes after the low potential side switching element Qul of the phase circuit Cu is turned off, and before the low potential side switching elements of the other phase circuits Cv and Cw are turned off at earliest time. According to this, the phase current values with an instantaneous value are acquired when the noise is reduced by detecting the phase current values at timing later than the normal timing, after the predetermined time passes after the low potential side switching element in the phase in which the ON time of the PWM signal is shorter than the predetermined time is turned off, and before the low potential side switching elements in other phases are turned off at the earliest time. Accordingly, the time taken until the phase current values are detected is not lengthened, and the phase current values which are less affected by noise are detected. In the present embodiment, time to detect the phase current value becomes later and performing of the current control becomes later, compared to the aforementioned first embodiment, and thus, the aforementioned first embodiment is preferred in view of a time to detect the phase current value.

As described above, in a case where the ON time of the PWM signal which is output to the low potential side switching element Qul of the phase circuit Cu is shorter than a predetermined time, the control unit 30 acquires the phase current values at the time of less noise from the current detectors Rv and Rw of at least the other phase circuits Cv and Cw. According to this, the multiphase electric motor control device can be provided which detects the phase current values by acquiring the phase current values with an instantaneous value at the time of less noise, and reducing effects of the noise without lengthening the time taken until the phase current values are detected.

The invention is not limited to the exemplified embodiments, and can be realized by a configuration in a range without departing from the content described in each item of the scope of Claims. That is, the invention illustrates and describes mainly and particularly specific embodiments, and the number, the amount, or other detailed configurations of the aforementioned embodiments can be modified in various types by the skilled in the art, without departing from the range of technical spirits and objects of the invention.

The invention claimed is:

1. A multiphase electric motor control device which controls a multiphase electric motor, said multiphase electric motor control device comprising:
   a bridge circuit which is configured by connecting phase circuits in parallel with one another in correspondence with respective phases of the multiphase electric motor, each of the phase circuits comprising:
       a high potential side switching element;
       a low potential side switching element; and
       a current detector which is provided on a closer side to a low potential than the low potential side switching element and which detects a phase current value,
       wherein the high potential side switching element, the low potential side switching element, and the current detector are connected in series to each other;
   a PWM control unit that outputs PWM signals to each of the switching elements of the bridge circuit such that the multiphase electric motor is rotatably driven based on a target value;
   a control unit that outputs a command voltage to the PWM control unit and acquires phase current values at a timing synchronized with a triangle wave; and
   a current value estimation unit that estimates a phase current value of one phase based on phase current values of other phases,
   wherein in a case where an ON time of the PWM signal output to the low potential side switching element of the one phase from the PWM control unit is shorter than a predetermined time, the control unit acquires the phase current values detected by the current detectors of at least the other phases at another timing which is earlier than the timing and which is before the low potential side switching element in the one phase is turned on and after a predetermined time elapses from turning on of one of the low potential side switching elements in the other phases, where the one of the low potential side switching elements of the other phases is turned on at a latest time among the low potential side switching elements of the other phases which are being turned on.

2. A multiphase electric motor control device which controls a multiphase electric motor, said multiphase electric motor control device comprising:
   a bridge circuit which is configured by connecting phase circuits in parallel with one another in correspondence with respective phases of the multiphase electric motor, each of the phase circuits comprising:
       a high potential side switching element;
       a low potential side switching element; and
       a current detector which is provided on a closer side to a low potential than the low potential side switching element and which detects a phase current value,
       wherein the high potential side switching element, the low potential side switching element, and the current detector are connected in series to each other;
   a PWM control unit that outputs PWM signals to each of the switching elements of the bridge circuit such that the multiphase electric motor is rotatably driven based on a target value;
   a control unit that outputs a command voltage to the PWM control unit and acquires phase current values at a timing synchronized with a triangle wave; and
   a current value estimation unit that estimates a phase current value of one phase based on phase current values of other phases,
   wherein in a case where an ON time of the PWM signal output to the low potential side switching element of the one phase from the PWM control unit is shorter than a predetermined time, the control unit acquires the phase current values detected by the current detectors of at least the other phases at another timing which is later than the timing and which is after a predetermined time passes after the low potential side switching element in the one phase is turned off and before one of the low potential side switching elements in the other phases is turned off at an earliest time among the low potential side switching elements which are being turned on.

3. A multiphase electric motor control device which controls a multiphase electric motor, said multiphase electric motor control device comprising:
   a bridge circuit which is configured by connecting phase circuits in parallel with one another in correspondence with respective phases of the multiphase electric motor, each of the phase circuits comprising:
       a high potential side switching element;
       a low potential side switching element; and
       a current detector which is provided on a closer side to a low potential than the low potential side switching element and which detects a phase current value,
       wherein the high potential side switching element, the low potential side switching element, and the current detector are connected in series to each other;
   a PWM control unit that outputs PWM signals to each of the switching elements of the bridge circuit such that the multiphase electric motor is rotatably driven based on a target value;

a control unit that outputs a command voltage to the PWM control unit and acquires phase current values at a timing synchronized with a triangle wave; and a current value estimation unit that estimates a phase current value of one phase based on phase current values of other phases, wherein in a case where an ON time of the PWM signal output to the low potential side switching element of the one phase from the PWM control unit is shorter than a predetermined time, the control unit acquires the phase current values which are detected by shifting the timing by using the current detectors of at least the other phases.

* * * * *